United States Patent
Metodiev et al.

(10) Patent No.: US 11,044,790 B2
(45) Date of Patent: Jun. 22, 2021

(54) SYSTEM AND METHOD OF MELTING AND CONTROLLING THE FLOW OF MOLTEN METAL BY ELECTROMAGNETIC FORCE UTILIZING MULTIPLE INDUCTION COILS

(71) Applicant: UltraFlex International, Inc., Ronkonkoma, NY (US)

(72) Inventors: Mario Metodiev, West Islip, NY (US); Eric Metodiev, West Islip, NY (US)

(73) Assignee: ULTRAFLEX INTERNATIONAL, INC., Ronkonkoma, NY (US)

( * ) Notice: Subject to any disclaimer, the term of this patent is extended or adjusted under 35 U.S.C. 154(b) by 0 days.

(21) Appl. No.: 16/446,795

(22) Filed: Jun. 20, 2019

(65) Prior Publication Data

US 2019/0394838 A1   Dec. 26, 2019

Related U.S. Application Data

(60) Provisional application No. 62/687,517, filed on Jun. 20, 2018.

(51) Int. Cl.
| | |
|---|---|
| *B22D 11/115* | (2006.01) |
| *B22D 39/00* | (2006.01) |
| *H05B 6/06* | (2006.01) |
| *H05B 6/10* | (2006.01) |
| *B22D 11/12* | (2006.01) |
| *B22D 11/00* | (2006.01) |

(52) U.S. Cl.
CPC ............ *H05B 6/101* (2013.01); *B22D 11/115* (2013.01); *B22D 11/122* (2013.01); *B22D 11/1213* (2013.01); *B22D 39/003* (2013.01); *H05B 6/06* (2013.01); *B22D 11/007* (2013.01)

(58) Field of Classification Search
CPC ... B22D 11/115; B22D 39/003; F27B 14/061; F27B 14/063; B33Y 10/00; H05B 6/34; H05B 6/36; H05B 6/06; H05B 6/067; H05B 6/24
See application file for complete search history.

(56) References Cited

U.S. PATENT DOCUMENTS

| | | | | |
|---|---|---|---|---|
| 3,463,365 A | * | 8/1969 | Dumont-Fillon | G01N 15/12 222/597 |
| 4,995,593 A | * | 2/1991 | Ford | B22D 41/01 266/227 |
| 5,012,487 A | | 4/1991 | Simcock | |

(Continued)

*Primary Examiner* — Kevin E Yoon
(74) *Attorney, Agent, or Firm* — Hoffmann & Baron, LLP

(57) ABSTRACT

An induction coil assembly associated with controlling the flow of molten material used in casting or deposition of precious and/or non-precious metals on a substrate is disclosed. The assembly comprises one or more induction coils associated with induction melting of electrically conductive material by applying a predetermined current value. The assembly further comprises a crucible comprising the electrically conductive material in which an electromagnetic field is generated therein by the predetermined current value applied to the induction coils. The electromagnetic field associated with the electrically conductive material is modulated; and is used to generate smaller units of the electrically conductive material by interrupting velocity of a flow of the material in order to produce grains or apply layers on the substrate. Corresponding methods are also disclosed.

20 Claims, 6 Drawing Sheets

(56) References Cited

U.S. PATENT DOCUMENTS

| | | | |
|---|---|---|---|
| 5,074,532 A * | 12/1991 | Ducrocq | B22D 39/003 |
| | | | 222/594 |
| 5,261,611 A * | 11/1993 | Huxford | B05B 5/00 |
| | | | 222/594 |
| 5,988,480 A | 11/1999 | Farnworth | |
| 6,144,690 A * | 11/2000 | Kusamichi | C22B 9/003 |
| | | | 373/147 |
| 6,507,598 B2 * | 1/2003 | Tsuda | F27B 14/063 |
| | | | 373/142 |
| 2014/0083638 A1 * | 3/2014 | Waniuk | B22D 17/32 |
| | | | 164/47 |
| 2017/0266728 A1 | 9/2017 | Johnson et al. | |
| 2018/0099461 A1 * | 4/2018 | Matthews | B29C 64/112 |

\* cited by examiner

SYSTEM AND METHOD OF MELTING AND CONTROLLING THE FLOW OF MOLTEN METAL BY ELECTROMAGNETIC FORCE UTILIZING MULTIPLE INDUCTION COILS

CROSS-REFERENCE TO RELATED APPLICATION(S)

This non-provisional application claims the benefit of U.S. Provisional Application No. 62/687,517, filed on Jun. 20, 2018, the specification of which is incorporated by reference herein, in its entirety for all purposes.

FIELD OF THE DISCLOSURE

The present disclosure is directed to the technical field of melting, casting and deposition of precious and non-precious metals utilizing induction melting and casting techniques and related system. More particularly, the present disclosure is directed to the technical field of induction melting, casting and deposition of metal into molds, permanent molds or investment casting. Furthermore, the present disclosure can be used for producing fine grains, ingots or deposition of layers of metal over metallic or non-metallic surfaces.

BACKGROUND

There are known devices and methods that seek to accomplish pressure or gravity casting of metals. Some of these devices use induction melting, while others use resistive heating to melt the metal. The casting is typically done by gravity or applying pressure in the chamber holding the crucible with the molten metal and pushing it through an opening on the bottom of the crucible into a permanent mold or investment flask placed underneath the crucible. There are also known methods of holding the molten metal in the crucible until it is ready to be casted. One such method is using a graphite or ceramic rod, which blocks the hole on the bottom of the crucible. Another method implements a mechanical gate, which stops the molten metal from leaking into the mold. The casting is initiated when the rod or the gate is removed and the molten metal begins to flow from the crucible into the mold or the investment flask.

It is desirable to implement a new and improved method of melting, casting and deposition of precious and non-precious metals that exhibit improved response time(s) and other advantages such as for example, controllability of the electromagnetic gate that achieves improved results than known mechanical methods.

Hence, it is desirable to implement a novel method of melting, casting and controlling the flow of molten metal by utilizing electromagnetic forces. The electromagnetic force created by a special arrangement of induction coils can hold the molten metal in the crucible, instead of using electro-mechanical devices such as rods or gates.

It is further desirable to implement an improved method that can also be used to control the flow of the molten metal by modulating the electromagnetic field, resulting in reducing and/or breaking the flow into small droplets that can be used to produce metal grains or to apply layers of metal onto a substrate.

It is further desirable to implement an improved and novel method that exhibits significant advantages over the existing methods. One such advantage is that the response time and controllability of the electromagnetic gate is superior than known mechanical methods.

Yet, it is further desirable to implement an improved and novel method that achieves elimination of moving parts and mechanical components, which results in reducing the wear and tear on these parts, thereby increasing reliability, durability and the operating life of the system.

SUMMARY OF THE INVENTION

In accordance with an embodiment or aspect, the present technology is directed to a system and method associated with induction melting, casting and/or deposition of metal into molds, permanent molds and/or investment casting. Furthermore, the present disclosure can be used for producing fine grains, ingots or deposition of layers of metal over metallic or non-metallic surfaces.

An induction coil assembly and/or apparatus in accordance with the embodiments disclosed herein, includes one or more induction coils, a crucible and an induction power supply. In certain aspects or embodiments, the induction coil assembly is associated with controlling the flow of molten material used in casting or deposition of precious and/or non-precious metals onto a substrate. The one or more induction coils are associated with induction melting of electrically conductive material by applying a predetermined current value. The crucible comprises electrically conductive material in which an electromagnetic field is generated by a predetermined current value applied to the induction coils. The electromagnetic field associated with the electrically conductive material is modulated; and is used to generate smaller units of the electrically conductive material by controlling a velocity of flow of the material in order to produce grains or apply layers onto the substrate.

In yet another embodiment, the substrate is a metallic or non-metal surface. Yet further the induction coil assembly generates one or more of fine grains, ingots and deposition of layers of the material over the substrate. In yet another embodiment, the induction coil assembly reduces the flow of the material by shifting the electromagnetic field on or off. In yet another embodiment, the induction coil assembly creates a stirring effect of the material resulting in a homogenous mixture of material associated with one or more materials being melted or alloyed. In yet another embodiment, the electromagnetic field is modulated in order to control the velocity of flow of molten metal, resulting in droplets that produce metal grains or application of layers of metal onto the substrate. In yet another embodiment, the induction coil assembly controls the flow of the material by adjusting a current amplitude value associated with one or more induction coils. In yet another embodiment, the induction coil assembly adjusts the electromagnetic field generated in the material by modifying a force amplitude value associated with the one or more induction coils. Yet further, the induction coil assembly modifies the force amplitude value by controlling a current amplitude value associated with the one or more induction coils via the at least one induction power supply.

A method associated with controlling the flow of molten material used in casting or deposition of precious and/or non-precious metals, in accordance with the embodiments disclosed herein, comprise the following steps. Induction melting is applied to one or more metals using an induction coil assembly. A flow of resultant molten material is controlled with the resultant molten material being associated with applied induction melting of the one or more metals. An electromagnetic field associated with the molten material is modulated using an electromagnetic gate. Smaller units of the molten material are generated by interrupting the flow of molten material in order to produce grains or droplets.

In certain embodiments, the method may further comprise the substrate is a metallic or non-metal surface. The method may further comprise generating one or more of fine grains, ingots and deposition of layers of molten metal over the substrate. The method may further comprise reducing the flow of the molten material by shifting the electromagnetic field on or off. The method may further comprise creating a stirring effect of the molten material resulting in a homogenous mixture of material associated with one or more materials being melted or alloyed. The method may yet further comprise that the electromagnetic field is modulated in order to control the velocity of flow of the molten metal, resulting in droplets that produce metal grains or application of layers of the metal onto the substrate. The method may yet further comprise controlling the flow of molten material by adjusting a current amplitude value associated with one or more induction coils. The method may yet further comprise adjusting the electromagnetic field generated in the molten material by modifying a force amplitude value associated with the one or more induction coils. The method may yet further comprise modifying the force amplitude value by controlling a current amplitude value associated with the one or more induction coils via an induction power supply.

A method associated with controlling the flow of molten material used in casting or deposition of precious and/or non-precious metals by modulating an electromagnetic field, in accordance with the embodiments disclosed herein, comprise the following steps. Induction melting is applied to one or more metals using an induction coil assembly. A flow of resultant molten material is controlled with the resultant molten material. An electromagnetic field associated with the molten material is modulated using an electromagnetic gate. One or more layers or droplets of the molten material are applied onto a substrate In certain embodiments, the method may further comprise the substrate is a metallic or non-metal surface. The method may further comprise generating one or more of fine grains, ingots and deposition of layers of molten metal over the substrate. The method may further comprise reducing the flow of the molten material by shifting the electromagnetic field on or off. The method may further comprise creating a stirring effect of the molten material resulting in a homogenous mixture of material associated with one or more materials being melted or alloyed. The method may yet further comprise that the electromagnetic field is modulated in order to control the velocity of flow of the molten metal, resulting in droplets that produce metal grains or application of layers of the metal onto the substrate. The method may yet further comprise controlling the flow of molten material by adjusting a current amplitude value associated with one or more induction coils. The method may yet further comprise adjusting the electromagnetic field generated in the molten material by modifying a force amplitude value associated with the one or more induction coils. The method may yet further comprise modifying the force amplitude value by controlling a current amplitude value associated with the one or more induction coils via an induction power supply.

These and other purposes, goals and advantages of the present application will become apparent from the following detailed description read in connection with the accompanying drawings. Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when/if used) indicate corresponding elements throughout the several views, and wherein as describe hereinbelow. Some embodiments or aspects are illustrated by way of example and not a limitation in the figures of the accompanying drawings in which.

Figure 1:
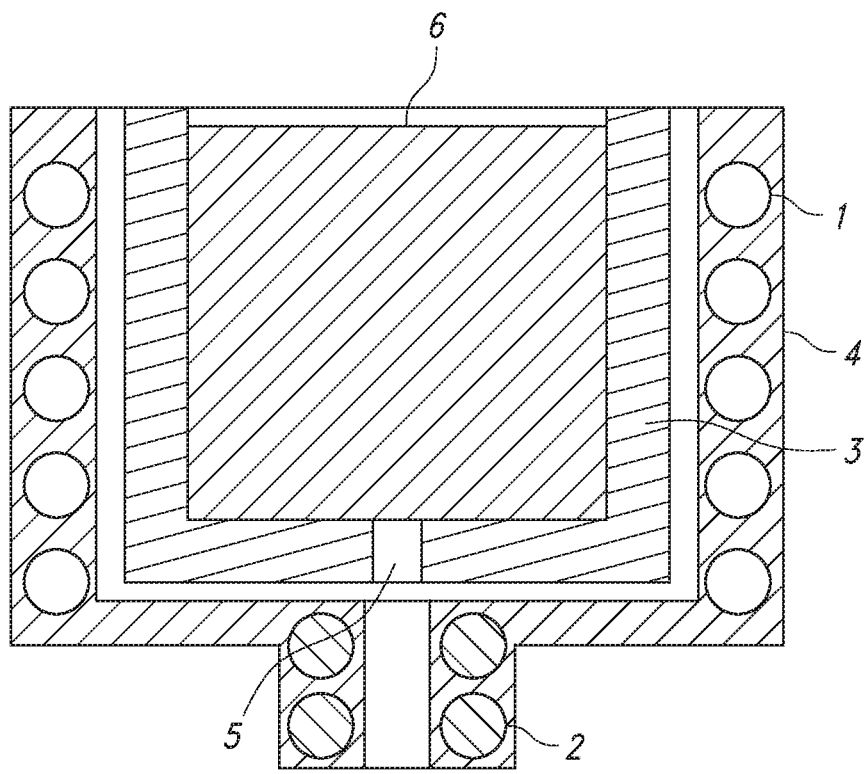
FIG. 1 illustrates a cross-sectional view of an induction coil assembly, in accordance with an embodiment of the disclosed system and method.

It should be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The following sections describe exemplary embodiments of the present disclosure. It should be apparent to those skilled in the art that the described embodiments of the present disclosure provided herein are illustrative only and not limiting, having been presented by way of example only.

All features disclosed in this description may be replaced by alternative features serving the same or similar purpose, unless expressly stated otherwise. Therefore, numerous other embodiments of the modifications thereof are contemplated as falling within the scope of the present disclosure as defined herein and equivalents thereto.

Throughout the description, where items are described as having, including, or comprising one or more specific components, or where processes and methods are described as having, including, or comprising one or more specific steps, it is contemplated that, additionally, there are items of the present disclosure that consist essentially of, or consist of, the one or more recited components, and that there are processes and methods according to the present disclosure that consist essentially of, or consist of, the one or more recited processing steps.

The present disclosure is directed to the technical field of melting, casting and deposition of precious and non-precious metals utilizing induction melting and casting techniques and related system. More particularly, the present disclosure is in the technical field of induction melting, casting and deposition of metal into molds, permanent molds or investment casting. Furthermore, the present disclosure can be used for producing fine grains, ingots or deposition of layers of metal over metallic or non-metallic surfaces.

In particular, the present disclosure is directed to a new method of melting, casting and controlling the flow of molten metal by utilizing electromagnetic forces. The electromagnetic force is created by a special arrangement of induction coils which can hold the molten metal in the crucible, instead of using electro-mechanical devices such as rods or gates. This method can be also used to control the flow of the molten metal by modulating the electromagnetic field, resulting in breaking the flow into small droplets that can be used to produce metal grains or to apply layers of metal onto a substrate. This novel method has significant advantages over the existing methods. One advantage is that the response time and controllability of the electromagnetic gate is far superior to known mechanical methods. Another significant advantage over existing technologies is the elimination of moving parts and mechanical components, which results in reducing the wear and tear on parts and increasing reliability, durability and the operating life of the system.

As shown in the drawings for purposes of illustration, referring now to the figures in more detail, shown in FIGS. 1 to 5, is an encapsulated induction coil assembly 4. In certain aspects or embodiments, the induction coil assembly 4 includes a crucible 3 placed inside the coil 1, as shown for example in FIG. 5.

FIG. 1 shows the cross sectional side view of the induction coil assembly 4, in accordance with an embodiment. Shown in FIG. 1, the coils 1 and 2 can be encapsulated in thermal insulating non-conductive material. A crucible 3 with a bottom opening 5 is placed and supported within the induction coil assembly 4. The crucible can be made from electrically conductive material such as graphite, as shown, or from non-conductive material. Electrically conductive material referred to as "charge" 6 is placed in the crucible 3. The charge 6 can be in the form of pieces, ingots or powder.

When AC current is applied to the coils (1, 2), it creates an electromagnetic field, which induces currents (eddy currents) in any electrically conductive material placed in the field. If the crucible 3 is made of electrically conductive material, the eddy currents are induced predominantly in its walls. If the crucible 3 is made of a non-conductive material, the electromagnetic field penetrates its walls and the eddy currents are generated directly into the charge 6.

When the current through coil 1 is large enough and the frequency is high enough, these eddy currents can generate enough heat in the charge 6 and melt it, or can heat the crucible 3 walls to temperatures exceeding the melting point of the charge 6, thus melting it by heat conduction.

In addition to the eddy currents, the electromagnetic field generated by the coil 1 and coil 2 also creates an electromagnetic force. The force created by the bottom coil 2, if directed properly and with enough strength, can act as a barrier and block or reduce the flow of the molten charge 6 in the crucible 3.

Figure 2:
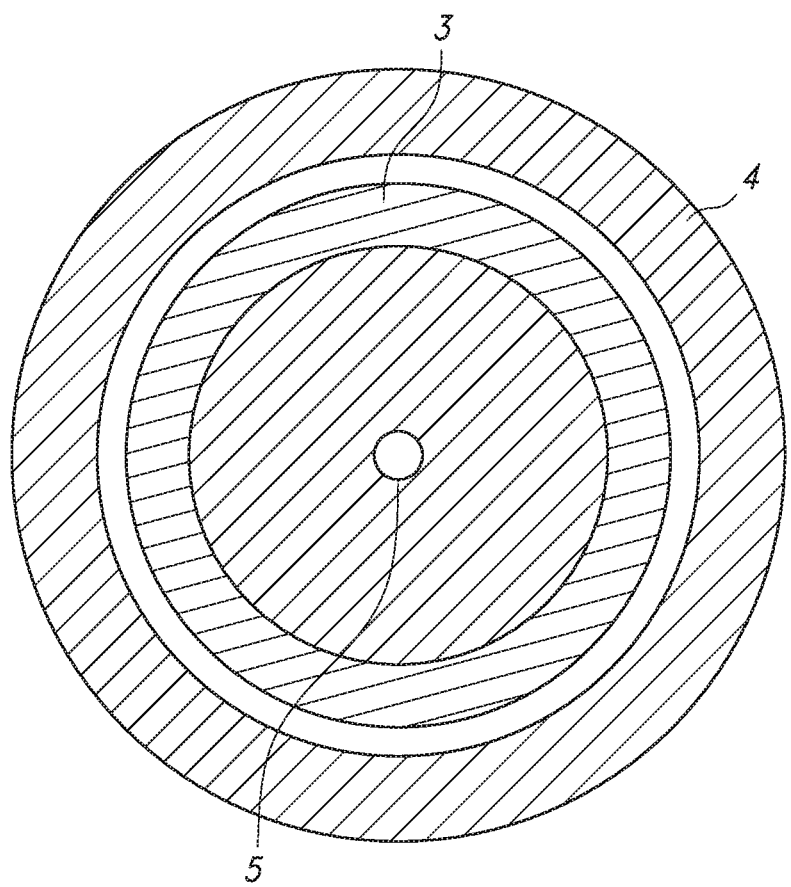
FIG. 2 provides a top view of an induction coil assembly and crucible, in accordance with an embodiment of the disclosed system and method.

Referring to FIG. 2, shown is a top view of the induction coil assembly 4 with the crucible 3 placed inside the assembly, in accordance with an embodiment of the disclosed system and method.

Referring back to the embodiment of FIG. 1, the coil assembly 4 and crucible 3 should be large enough to hold enough charge 6. The inside diameter of the crucible 3, for example, can range from 1 to about 20 inches. The surface area of bottom openings (5 and 7) in certain embodiments, should be small enough such that the electromagnetic force generated in and around the surface area, can stop the charge from flowing through.

The structural details of an embodiment is shown in connection with FIG. 1 as follows. In particular, coil 1 and coil 2 can be liquid cooled tubes, as shown, or alternatively can be cooled by convection or forced air.

Coil 1 and coil 2 can be fabricated from round pipes, as shown, or can be fabricated from solid bars, multi-stranded cable or Litz wire.

The shape of coil 1 and coil 2 can be round, as shown, or can be square, rectangular or any other shape suitable for making such induction heating coils.

The shape of the induction coil assembly 4 may be round, as shown or can be elliptical, or any other contemplated shape that is suitable for fabricating the induction coil assembly 4.

In certain embodiments or aspects, the bottom opening 5 of the crucible 3 shown in FIG. 1 can comprise a single opening as shown in FIG. 2. In an alternative embodiment, the bottom opening 5 of FIG. 1 can comprise an array of openings 7 with different geometries, as shown for example, in FIG. 3.

The positions of the coil turns in coil 2 can be vertically or horizontally stacked, or any position to achieve the electromagnetic force. The number of turns may be one, two, or any other number.

The coil turns in coil 1 can be evenly spaced or with varying spacing, to create gradient in the electromagnetic field strength.

In certain aspects or embodiments, the materials used in forming, fabricating and/or constructing the induction coil assembly illustrated in FIG. 1 are described in greater detail hereinbelow.

Coil 1 and coil 2 can be made of copper, aluminum or any other electrically conductive material suitable for making induction heating coils.

The coils in the induction coil assembly 4 can be painted and/or encapsulated in cement, epoxy or any other thermally insulating material. Multiple coils may be implemented in certain embodiments beyond using coil 1 and coil 2 shown in FIG. 1.

The crucible 3 in certain embodiment(s), may be fabricated from electrically conductive materials such as graphite, silicon carbide, steel, molybdenum or non-conductive materials such as ceramics, quartz, etc.

Figure 6:
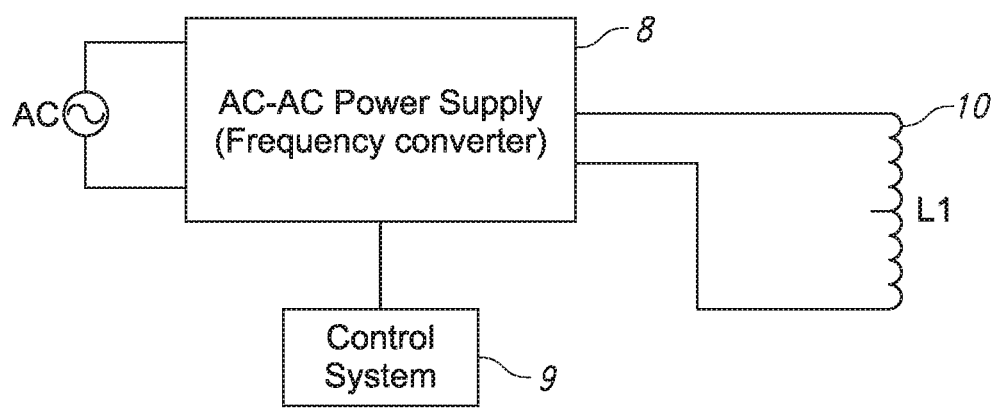
FIG. 6 provides an illustration of an electrical block diagram providing one exemplary realization of the disclosed induction melting and casting system, in accordance with an embodiment of the disclosed system and method.

In yet a further embodiment of the induction coil assembly 4 described herein above in connection with FIG. 1 is shown in FIG. 6. In particular, shown in FIG. 6 is both coil 1 and coil 2 which are connected in series and electrically can be viewed as one combined coil 10. This combined coil L1 (10) can be connected to a single AC power source 8 controlled by a control system 9. Such control system 9 may further comprise or be connected to for example, the example computing system as described herein below in connection with FIG. 8.

Figure 7:
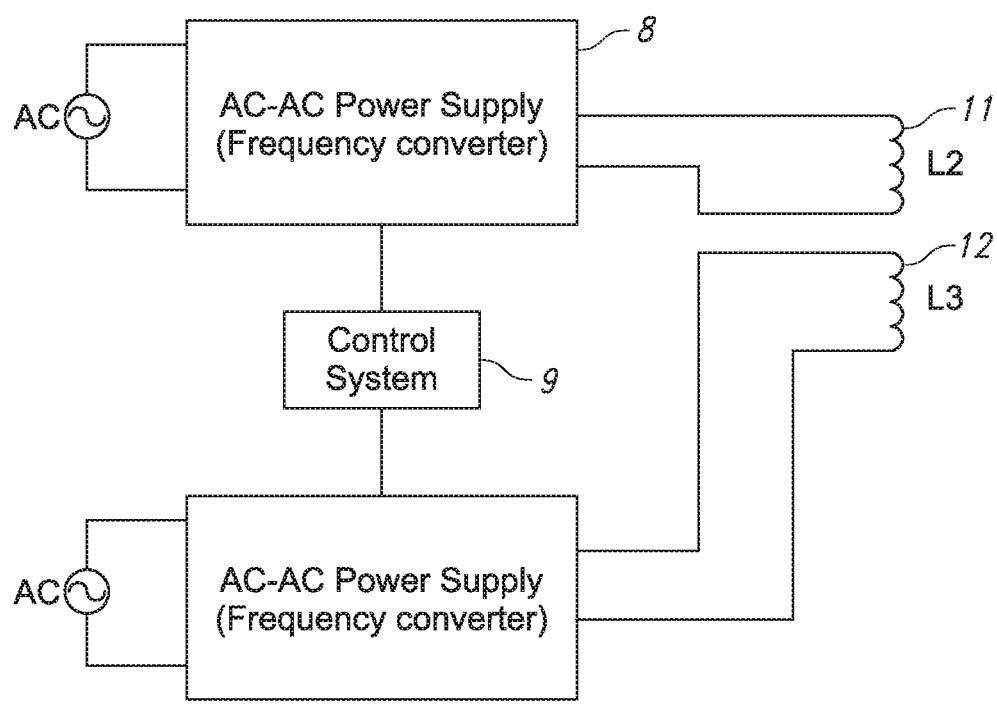
FIG. 7 provides an illustration of an electrical block diagram providing an alternative exemplary realization of the disclosed induction melting and casting system, in accordance with an embodiment of the disclosed system and method.

In yet another embodiment of the induction coil assembly 4 as described in connection with FIG. 1, the two coils 11 and 12 (for example, shown as L2 and L3) can be connected to two separate AC power sources 8 controlled by a single control system 9, as shown in FIG. 7. In this embodiment as shown in FIG. 7, one coil may be used predominantly for heating and melting, and the alternate coil may be used predominantly for electromagnetic force, shaping, and stirring. The two induction coils L2 and L3 can operate at different frequencies and power levels that are optimized for their respective heating and electromagnetic force properties. Such control system 9 may further comprise or be connected to for example, the example computing system as described herein below in connection with FIG. 8.

The method of controlling the flow of molten metal, as described in detail hereinabove in connection with the disclosure in FIG. 1, has significant benefits and advantages over the existing methods used in casting and layer deposition.

One such advantage is the controllability of the electromagnetic gate, which renders results found to be improved and superior to known mechanical methods. The fast response time and ability to turn the electromagnetic field on and off very quickly, allows the system to break the flow of the molten charge 6 and produce droplets with very small size.

In particular, in certain embodiments, the electromagnetic gate effect is based on the so called Lorentz force created by the electromagnetic field. It is proportional to the field intensity. Depending on the induction coil design, this Lorentz force can be given a gradient or controlled by the induction power supply so it has the effect of a valve. The amplitude of this force can be controlled by controlling the current amplitude through the induction coil, thus creating a valve effect for the liquid metal flowing through the coil. By increasing or decreasing the Lorenz force, the flow rate of the metal can be controlled or completely interrupted. Hence, the Lorenz force effect is used in the industry for stirring or mixing the molten metal.

The Lorenz force (or electromagnetic force) is the combination of electric and magnetic force on a point charge due to electromagnetic fields. A particle of charge q moving with a velocity v in an electric field E and a magnetic field B experiences a force defined by equation (1) provided below as:

$$F=qE+qv\times B \quad \text{Equation (1)}$$

wherein the value of the Lorenz force F is expressed in SI units.

Variations on this basic formula describe the magnetic force on a current-carrying wire (sometimes called Laplace force), the electromotive force in a wire loop moving through a magnetic field (an aspect of Faraday's law of induction), and the force on a charged particle which might be traveling near the speed of light (relativistic form of the Lorentz force).

The force F acting on a particle of electric charge q with instantaneous velocity v, due to an external electric field E and magnetic field B, is given by (in SI units) defined hereinbelow as equation (2):

$$F=q(E+v\times B) \quad \text{Equation (2)}$$

wherein x is the vector cross product (with all boldface quantities shown in equation (2) are vectors). In terms of cartesian components, defined herein below are the equations (3)-(5) for each of the respective Cartesian component values $F_x$, $F_y$ and $F_z$:

$$F_x=q(E_x+v_yB_z-v_zB_y) \quad \text{Equation (3)}$$

$$F_y=q(E_y+v_zB_x-v_xB_z) \quad \text{Equation (4)}$$

$$F_z=q(E_z+v_xB_y-v_yB_x) \quad \text{Equation (5)}$$

In general, the electric and magnetic fields are functions of the position and time. Therefore, explicitly, the Lorentz force can be expressed as Equation (6) provided hereinbelow as:

$$F(r,\dot{r},t,q)=q[E(r,t)+\dot{r}\times B(r,t)] \quad \text{Equation (6)}$$

Wherein r is the position vector of the charged particle, t is time, and the overdot $\dot{r}$ is a time derivative.

A positively charged particle will be accelerated in the same linear orientation as the E field, but will curve perpendicularly to both the instantaneous velocity vector v and the B field according to the right-hand rule (in detail, if the fingers of the right hand are extended to point in the direction of v and are then curled to point in the direction of B, then the extended thumb will point in the direction of F).

The term qE is called the electric force, while the term q(v×B) is called the magnetic force. According to certain embodiments, the term "Lorentz force" refers specifically to the formula for the magnetic force, with the total electromagnetic force (including the electric force) which may be given some other (nonstandard) name.

The magnetic force component of the Lorentz force manifests itself as the force that acts on a current-carrying wire in a magnetic field. In that context, it is also called the Laplace force.

The Lorentz force is a force exerted by the electromagnetic field on the charged particle, that is, it is the rate at which linear momentum is transferred from the electromagnetic field to the particle. Associated with it is the power which is the rate at which energy is transferred from the electromagnetic field to the particle. That power is defined by equation (7) provided hereinbelow as:

$$v\times F=qv\times E \quad \text{Equation (7)}$$

It is noted that the magnetic field does not contribute to the power because the magnetic force is generally perpendicular to the velocity of the particle. In addition, for a continuous charge distribution in motion, the Lorentz force equation is expressed as Equation (8) provided hereinbelow as:

$$dF=dq(E+v\times B) \quad \text{Equation (8)}$$

wherein dF is the force on a small piece of the charge distribution with charge dq. If both sides of this equation (8) are divided by the volume of this small piece of the charge distribution dV, the result becomes expressed as equation (9) provided hereinbelow as:

$$f=\rho(E+v\times B) \quad \text{Equation (9)}$$

wherein f is the force density (force per unit volume) and ρ is the charge density (charge per unit volume). Next, the current density corresponding to the motion of the charge continuum is defined by equation (10) provided hereinbelow as:

$$J = \rho v \quad \text{Equation (10)}$$

The continuous analogue to equation (10) is defined as Equation (11) provided hereinbelow as:

$$F = \rho E + J \times B \quad \text{Equation (11)}$$

The total force is defined as the volume integral over the charge distribution provided hereinbelow as:

$$F = \iiint (\rho E + J \times B) dV \quad \text{Equation (12)}$$

By eliminating ρ and J, using Maxwell's equations, and manipulating using the theorems of vector calculus, this form of the equation can be used to derive the Maxwell stress tensor σ, which in turn this can be combined with the Poynting vector S to obtain the electromagnetic stress-energy tensor T used in general relativity. In terms of σ and S, another way to express the Lorentz force (per unit volume) is defined by Equation (13) hereinbelow as:

$$F = \nabla \cdot \sigma - \frac{1}{c^2} \frac{\partial S}{\partial t} \quad \text{Equation (13)}$$

wherein where c is the speed of light and ∇· denotes the divergence of a tensor field. Rather than the amount of charge and its velocity in electric and magnetic fields, this equation (13) relates the energy flux (flow of energy per unit time per unit distance) in the fields to the force exerted on a charge distribution.

The density of power associated with the Lorentz force in a material medium is defined by equation (14) hereinbelow as:

$$J \cdot E \quad \text{Equation (14)}$$

If the total charge and total current is separated into their respective free and bound parts, the density of the Lorentz force is then expressed as equation (15) defined hereinbelow as:

$$f = (\rho_f - \nabla \cdot P)E + \left(J_f + \nabla \times M + \frac{\partial P}{\partial t}\right) \times B. \quad \text{Equation (15)}$$

wherein, $\rho_f$ is the density of free charge; P is the polarization density; $J_f$ is the density of free current; and M is the magnetization density. In this way, the Lorentz force can explain the torque applied to a permanent magnet by the magnetic field. The density of the associated power is defined by equation (16) hereinbelow as:

$$\left(J_f + \nabla \times M + \frac{\partial P}{\partial t}\right) \cdot E. \quad \text{Equation (16)}$$

The modern Maxwell's equations in theory describe how electrically charged particles and currents or moving charged particles give rise to electric and magnetic fields while the Lorentz force law describes the force acting on a moving point charge q in the presence of electromagnetic fields. The Lorentz force law in theory describes the effect of E and B upon a point charge, but such electromagnetic forces are not the only forces that may impact the charged particle(s). However, from a practical standpoint, charged particles may be coupled to other forces, notably gravity and nuclear forces. Thus, Maxwell's equations generally do not stand separate from other physical laws, but are coupled to them via the charge and current densities. The response of a point charge to the Lorentz law is one aspect; the generation of E and B by currents and charges is another aspect.

As applicable to real materials, the Lorentz force may be inadequate to describe the collective behavior of charged particles, both in principle and as a matter of computation. The charged particles in a material medium not only respond to the E and B fields but also generate these fields. Complex transport equations must be solved to determine the time and spatial response of charges, for example, the Boltzmann equation or the Fokker-Planck equation and/or the Navier-Stokes equations. For example, refer to phenomena of magnetohydrodynamics, fluid dynamics, electrohydrodynamics, superconductivity, and/or stellar evolution. Refer to for example, Green-Kubo relations and Green's function (many-body theory) which characterize these different phenomena that partake in the analysis of understanding the response and behavior patterns of charged particles and respective forces at play.

However, Lorentz force law defines that the electromagnetic force F on a test charge at a given point and time is a certain function of its charge q and velocity v, which can be parameterized by exactly two vectors E and B, in the functional form as defined by equation (2) hereinabove. This force law applies, even for particles approaching the speed of light (that is, magnitude of v=|v|≈c). Hence, the two vector fields E and B are thereby defined throughout space and time, and these are called the "electric field" and "magnetic field". The fields are defined everywhere in space and time with respect to what force a test charge would receive regardless of whether a charge is present to experience the force. As a definition of E and B, the Lorentz force is a definition in principle because a real particle (as opposed to the hypothetical "test charge" of infinitesimally small-sized mass and charge) would generate its own finite E and B fields, which would alter the electromagnetic force that it experiences.

Figure 9:
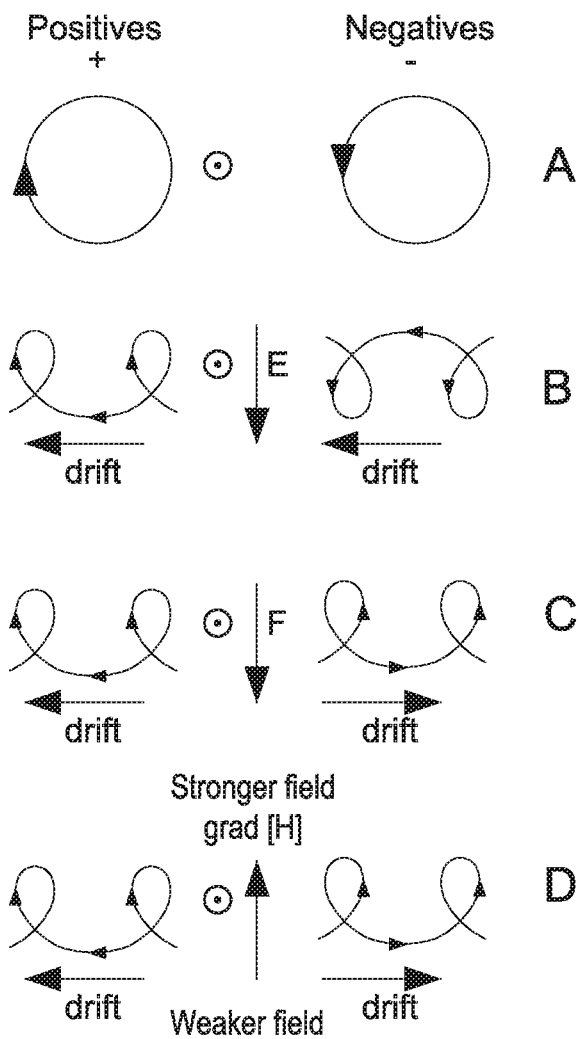
FIG. 9 is an illustration of charged particle drifts in an exemplary homogenous magnetic field environment, in accordance with an embodiment of the disclosed system and method.

In addition, if the charge experiences acceleration, as if forced into a curved trajectory by some external agency, it emits radiation that causes braking of its motion. Refer to for example, the phenomena defined as Bremsstrahlung and synchrotron light. These effects occur through both a direct effect (called the radiation reaction force) and indirectly (by affecting the motion of nearby charges and currents). Moreover, net force generally includes forces such as gravity, electroweak, and any other forces aside from electromagnetic force. Shown in FIG. 9 is an illustration of charged particle drifts in an exemplary homogenous magnetic field environment. Shown in FIG. 9, Panel A are the drift patterns in charged particles when no disturbing force(s) are applied. Panel B shows an electric field, E formed and the resultant charged particle drift patterns. Panel C illustrates an independent force, F (for example, gravity) and resultant charged particle drift patterns. Finally, panel D illustrates a stronger directional field grad |H| in an inhomogeneous magnetic field, grad |H| and weaker directional field shown with respective charged particle drifts. The circle and dot symbol ⊙ as illustrated in each of panel A-D represents the magnetic field in upwards direction as visualized relative to and through the paper.

In addition to the above recited benefits of the disclosed method, the elimination of moving parts and mechanical components by implementation of one or more embodiments of disclosed novel method, results in eliminating the wear and tear on these component parts and thereby increases reliability, durability and operating life of the system.

The electromagnetic field penetrating the crucible 3 from the bottom openings 5 or 7 creates stirring effect of the molten charge 6, thus resulting in more homogenous mixture, when different materials are being melted or alloyed.

Figure 3:
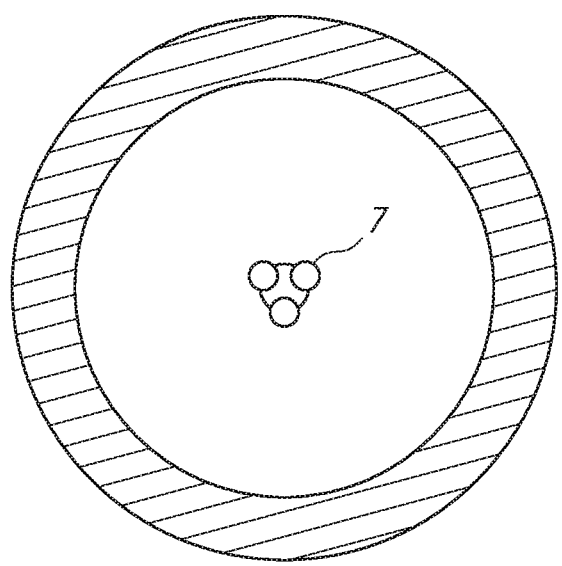
FIG. 3 provides a top view of an alternative hole pattern of the bottom of the crucible, in accordance with an embodiment of the disclosed system and method.
Figure 4:
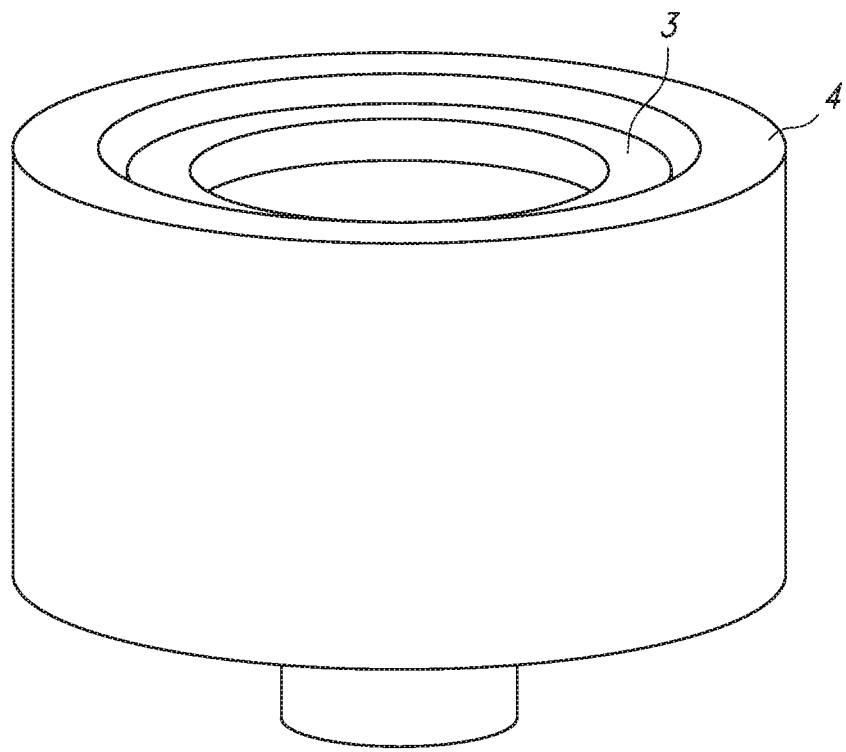
FIG. 4 provides an overall perspective view of an exemplary encapsulated induction coil assembly and crucible, in accordance with an embodiment of the disclosed system and method.
Figure 5:
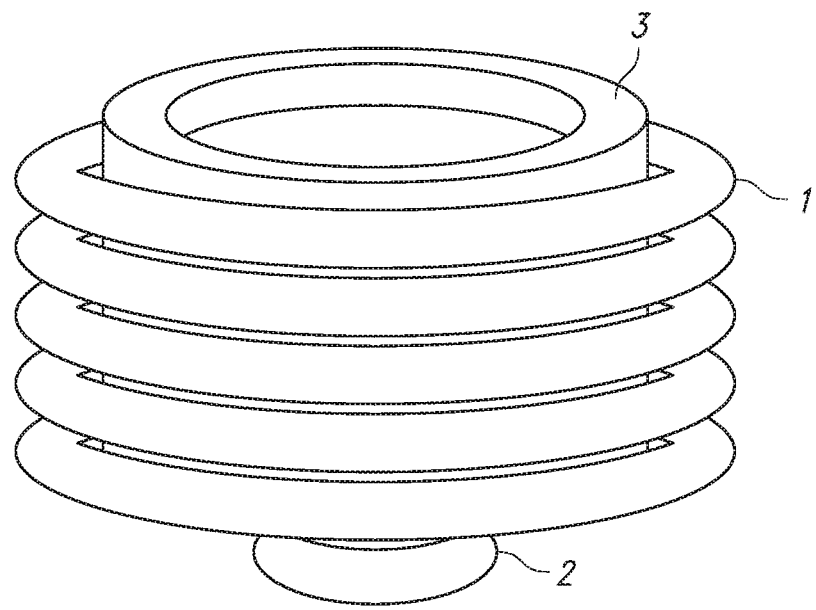
FIG. 5 provides a perspective view of an assembly with exposed coils which in such example embodiment are not encapsulated in insulating material, in accordance with an embodiment of the disclosed system and method.

When multiple openings are used on the bottom of the crucible 3, as shown for example, in FIG. 3, a "rain shower" effect is created which provides smooth flow of the metal and avoids turbulence and splashing of the charge 6 when poured.

Hence, disclosed is a method for controlling the flow in metal casting systems, utilizing gravity, pressure or other casting and deposition methods.

Exemplary systems described in connection with any one or more of FIGS. 1-7, can be used to cast molten metal into molds, permanent molds, or investment casting. The described methods in connection with any one or more of FIGS. 1-7, can be used for investment casting of intricate parts for medical, dental, jewelry and/or industrial applications. The embodiments described in connection with any one or more of FIGS. 1-7, can also be used in systems or machines producing metal grains or depositing thin layers of metal onto a substrate.

In addition, one or more embodiments, or elements thereof, can be implemented and/or automated in the form of an apparatus including a storage device or memory, and at least one processing device or processor that is coupled to the memory and operative to perform a method according to one or more embodiments.

Figure 8:
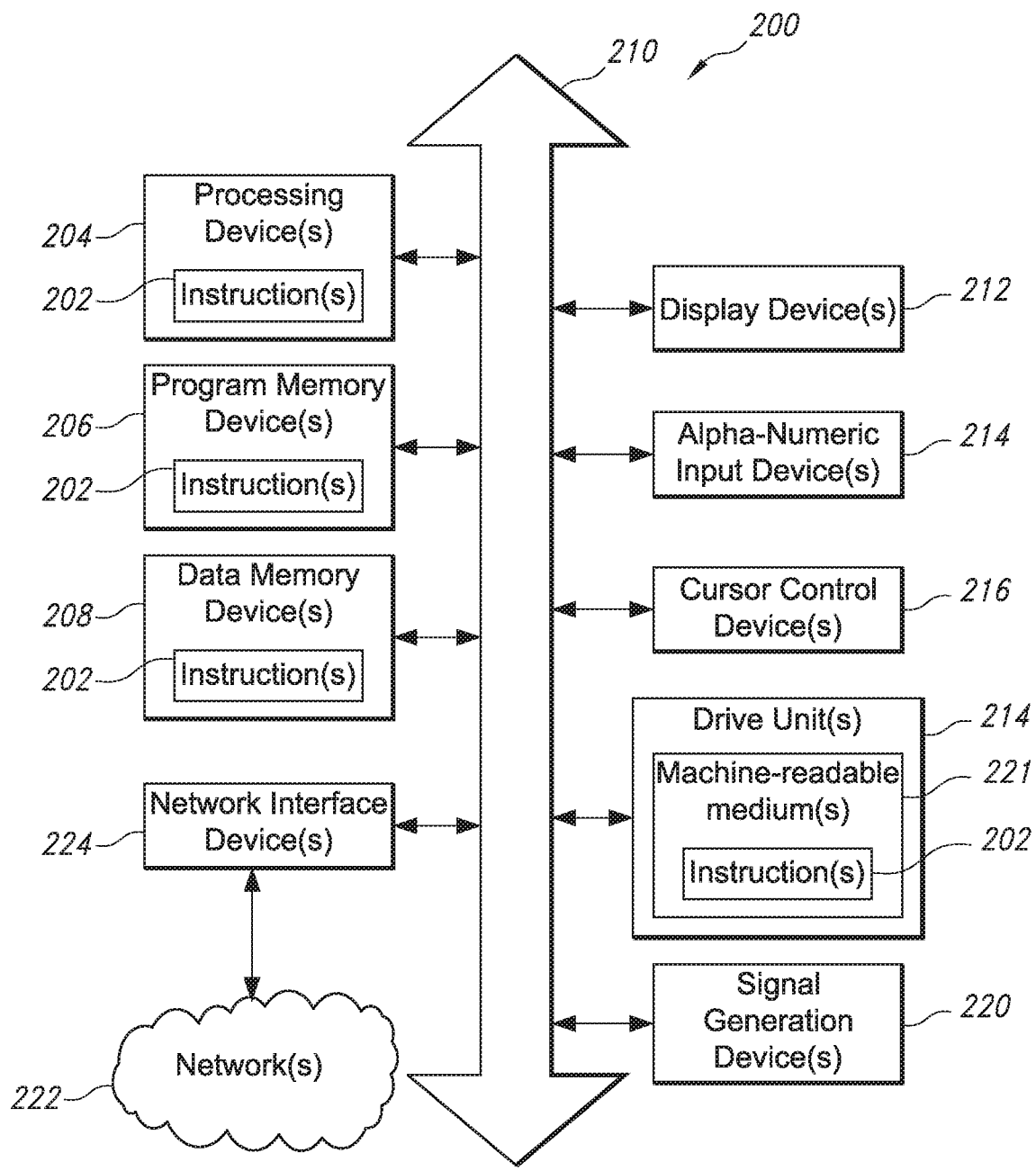
FIG. 8 is a block diagram showing a portion of an exemplary machine in the form of a computing system that performs methods according to one or more embodiments disclosed herein.

One or more embodiments disclosed herein, or a portion thereof, make use of software running on a computer or workstation. By way of example, only and without limitation, FIG. 8 is a block diagram of an embodiment of a machine in the form of a computing system 200, within which is a set of instructions 202 that, when executed, cause the machine to perform any one or more of the methodologies according to embodiments disclosed herein. In one or more embodiments, the machine operates as a standalone device; in one or more other embodiments, the machine is connected (e.g., via a network 222) to other machines. In a networked implementation, the machine operates in the capacity of a server or a client user machine in a server-client user network environment. Exemplary implementations of the machine as contemplated by embodiments disclosed herein include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 200 includes a processing device(s) 204 (e.g., a central processing unit (CPU), a graphics processing unit (GPU), or both), program memory device(s) 206, and data memory device(s) 208, which communicate with each other via a bus 210. The computing system 200 further includes display device(s) 212 (e.g., liquid crystal display (LCD), flat panel, solid state display, or cathode ray tube (CRT)). The computing system 200 includes input device(s) 214 (e.g., a keyboard), cursor control device(s) 216 (e.g., a mouse), disk drive unit(s) 218, signal generation device(s) 220 (e.g., a speaker or remote control), and network interface device(s) 224, operatively coupled together, and/or with other functional blocks, via bus 210.

The disk drive unit(s) 218 includes machine-readable medium(s) 226, on which is stored one or more sets of instructions 202 (e.g., software) embodying any one or more of the methodologies or functions herein, including those methods illustrated herein. The instructions 202 may also reside, completely or at least partially, within the program memory device(s) 206, the data memory device(s) 208, and/or the processing device(s) 204 during execution thereof by the computing system 200. The program memory device(s) 206 and the processing device(s) 204 also constitute machine-readable media. Dedicated hardware implementations, such as but not limited to ASICs, programmable logic arrays, and other hardware devices can likewise be constructed to implement methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 212, input device(s) 214, cursor control device(s) 216, signal generation device(s) 220, etc., can be collectively referred to as an "input/output interface," and is intended to include one or more mechanisms for inputting data to the processing device(s) 204, and one or more mechanisms for providing results associated with the processing device(s). Input/output or I/O devices (including but not limited to keyboards (e.g., alpha-numeric input device(s) 214, display device(s) 212, and the like) can be coupled to the system either directly (such as via bus 210) or through intervening input/output controllers (omitted for clarity).

In an integrated circuit implementation of one or more embodiments, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of the disclosed embodiments.

An integrated circuit in accordance with the disclosed embodiments can be employed in essentially any application and/or electronic system in which buffers are utilized. Suitable systems for implementing one or more embodiments include, but are not limited to, personal computers, interface devices (e.g., interface networks, high-speed memory interfaces (e.g., DDR3, DDR4), etc.), data storage systems (e.g., RAID system), data servers, etc. Systems incorporating such integrated circuits are considered part of the disclosed embodiments. Given the teachings provided herein, one of ordinary skill in the art will be able to contemplate other implementations and applications.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 202, or that which receives and executes instructions 202 from a propagated signal so that a device connected to a network environment 222 can send or receive voice, video or data, and to communicate over the network 222 using the instructions 202. The instructions 202 are further transmitted or received over the network 222 via the network interface device(s) 224. The machine-readable medium also contains a data structure for storing data useful in providing a functional relationship between the data and a machine or computer in an illustrative embodiment of the systems and methods herein.

While the machine-readable medium 202 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

Although the present specification describes components and functions implemented in the embodiments with reference to particular standards and protocols, the disclosed embodiment are not limited to such standards and protocols.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method associated with controlling a flow of molten material used in casting or deposition of precious and/or non-precious metals, the method comprising:

applying induction melting to one or more metals using an induction coil assembly, the one or more metals being contained in a crucible placed and supported within the induction coil assembly, the induction coil assembly comprising:

one or more induction coils; and
    a bottom coil;

controlling a flow of resultant molten material associated with applied induction melting of the one or more metals;

modulating an electromagnetic field associated with the molten material using an electromagnetic gate, a flow rate of the molten material being inversely controlled as a function of an amplitude of current applied to the bottom coil; and generating grains, droplets, or multiple layers of the molten material by reducing the flow of the resultant molten material by controlling the amplitude of current applied to the bottom coil of the induction coil assembly, to thereby control an electromagnetic force created by the bottom coil, in order to deposit discrete units of the grains or the droplets; or cast the multiple layers of the molten material on a surface.

2. The method of claim 1, wherein the surface is a metallic or non-metal surface.

3. The method of claim 1, wherein the method further comprises generating one or more of: discrete units of the grains, droplets; ingots; and/or deposition of layers of molten material over the surface.

4. The method of claim 1, wherein the method further comprises reducing the flow of the molten material by shifting the electromagnetic field on or off.

5. The method of claim 1, wherein the method further comprises creating a stirring effect of the molten material resulting in a homogenous mixture of material associated with one or more materials being melted or alloyed.

6. The method of claim 1, wherein the electromagnetic field is modulated to control a velocity of the flow of molten material, resulting in droplets that produce metal grains or application of layers of the molten material on the surface.

7. The method of claim 1, wherein the method further comprises controlling the flow of molten material by adjusting a current amplitude value associated with one or more induction coils.

8. The method of claim 1, wherein the method further comprises adjusting the electromagnetic field generated in the molten material by modifying a force amplitude value associated with the one or more induction coils.

9. The method of claim 8, wherein the method further comprises modifying the force amplitude value by controlling a current amplitude value associated with the one or more induction coils via an induction power supply.

10. The method of claim 1, further comprising reducing turbulence in the flow of molten material by forming a plurality of openings in a bottom of the crucible through which the molten material flows.

11. The method of claim 1, further comprising applying a first current having a first amplitude and a first frequency to the multiple induction coils, and applying a second current having a second amplitude and a second frequency to the bottom coil, whereby melting of the one or more metals and controlling the flow rate of the resultant molten material are independently controlled as a function of the first and second currents, respectively.

12. A method associated with controlling the flow of molten material used in casting or deposition of precious and/or non-precious metals onto a substrate by modulating an electromagnetic field, the method comprising:

applying induction melting to one or more metals using an induction coil assembly, the induction coil assembly comprising:

one or more induction coils;
a bottom coil; and
a crucible comprising at least an electrically conductive layer;
controlling a flow of resultant molten material;
modulating the electromagnetic field associated with the molten material using an electromagnetic gate that controls the flow of the resultant molten material by controlling an amplitude of current applied to the bottom coil of the induction coil assembly, a flow rate of the molten material being inversely controlled as a function of the amplitude of current applied to the bottom coil; and
applying multiple layers, grains, or droplets of the molten material onto the substrate.

13. The method of claim 12, wherein the substrate is of a metallic or non-metal surface.

14. The method of claim 12, wherein the method further comprises generating one or more of: discrete units of grains, droplets, and ingots and/or deposition of the layers of the molten material over the substrate.

15. The method of claim 12, wherein the method further comprises reducing the flow of the molten material by shifting the electromagnetic field on or off.

16. The method of claim 12, wherein the method further comprises creating a stirring effect of the molten material resulting in a homogenous mixture of material associated with one or more materials being melted or alloyed.

17. The method of claim 12, wherein the electromagnetic field is modulated to control a velocity of the flow of the molten material, resulting in droplets that produce metal grains or application of the layers of the molten material on a surface.

18. The method of claim 12, wherein the method further comprises controlling the flow of molten material by adjusting a current amplitude value associated with one or more induction coils.

19. The method of claim 12, wherein the method further comprises adjusting the electromagnetic field generated in the molten material by modifying a force amplitude value associated with the one or more induction coils.

20. The method of claim 19, wherein the method further comprises modifying the force amplitude value by controlling a current amplitude value associated with the one or more induction coils via an induction power supply.

* * * * *